Aug. 27, 1957  K. HUBÁLEK ET AL  2,804,004
DEVICE FOR CONTROLLED THINNING OF PLANTS
Filed Oct. 5, 1955  2 Sheets-Sheet 1

INVENTORS
Karel Hubálek - Jan Hubálek,-
Jaroslav Pinkas - Karel Žák -
Vlastimil Žert - Karel Huttan-
By Richard Low
Agt

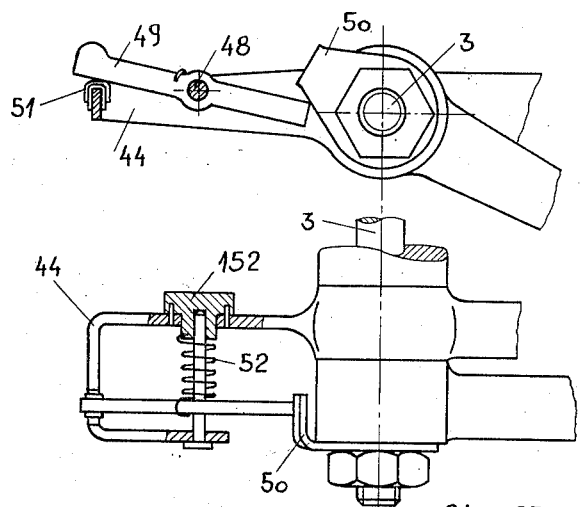
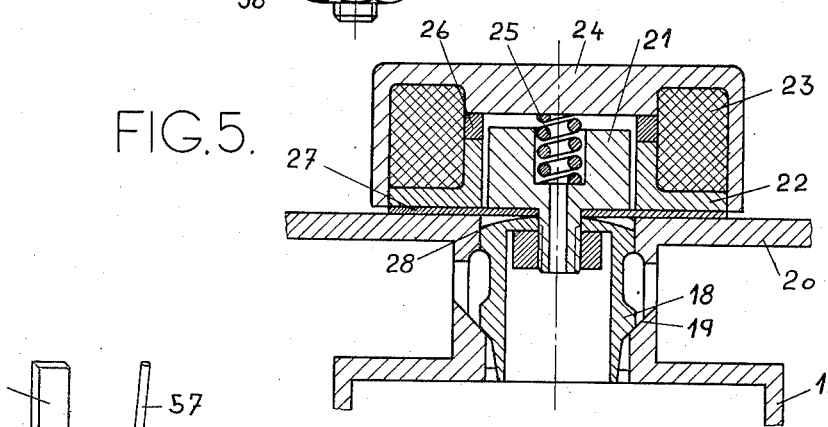
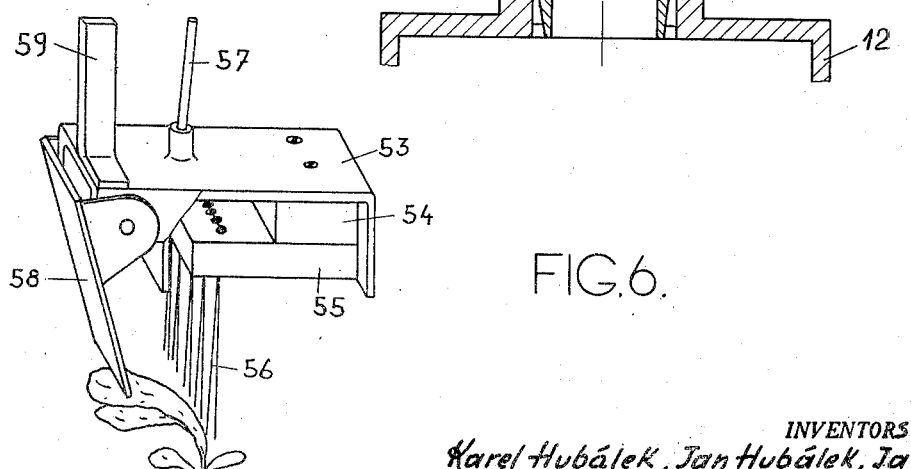

United States Patent Office 2,804,004
Patented Aug. 27, 1957

2,804,004

DEVICE FOR CONTROLLED THINNING OF PLANTS

Karel Hubálek, Prague-Vokovice, Jan Hubálek and Jaroslav Pinkas, Prague, Karel Žák, Kardasova Recice, Vlastimil Žert, Hranice, and Karel Kultan, Plzen, Czechoslovakia, assignors to Vyzkumny ustav zemedelskych stroju, Prague, Czechoslovakia Application October 5, 1955, Serial No. 538,564

11 Claims. (Cl. 97—19)

The present invention relates to improvements in a device for controlled thinning of plants such as sugar beet, poppy, vegetables and other crops.

The principle of controlled thinning resides therein that the spaces between uncut patches, left in the row of plants, are not of uniform length, the spacing being dependent on the growth of the plant in the middle of the patch, while the spaces between consecutive plants left in the row must not be smaller than a predetermined minimum distance.

The controlled thinning saves much manual labor and, provided the drilling has been carried out in a suitable way, may even make hand singling superfluous.

Numerous devices for controlled thinning have already been suggested, but none of them has proved satisfactory. The hitherto proposed constructions are mostly mechanical thinners, requiring the operator to manually control the operation of the cutting means. Machines of this type are inaccurate and slow in operation, tiresome for the operator, who is able to work with the machine for short periods only and the results achieved are poor.

It has already been suggested to use an electronic apparatus for the selection of plants which are to be left in the row. These devices use a feeler electrode which is adapted to be brought into contact with the plants and which is connected to a control grid of an electron discharge tube, interposed in the control circuit of cutting means driven by the wheels of the machine. In consequence of the change of the electric condition of the electrode, and thus also of the grid, caused by the contact of the electrode with the plant, impulses are produced, said impulses being transmitted to the cutting mechanism. Devices of this type have not proved satisfactory in practice owing to the complexity of the electric part of the machine and the relative inefficiency of the cutting mechanism, which does not permit utilization of the high speed at which the electronic device is capable of operating.

It is an object of the present invention to provide a device for controlled thinning, employing an electronic apparatus for the selection of plants to be left in the row, adapted to operate with high speed and high efficiency.

A further object of the invention is to provide a device for controlled thinning operating automatically and requiring no attention by the operator.

Another object of the invention is to provide a device for controlled thinning which is relatively simple, may be operated by an unskilled operator, and is adapted to work under rough field conditions.

With these and other objects in view, a device embodying the present invention has a control relay interposed in the anode circuit of an electron discharge tube and adapted to actuate a control contact of a trigger circuit, the latter comprising a main relay which controls main contacts common to a feeding circuit of an electromagnetic valve of a pneumatic cutting device and to a self-locking circuit extending from the main contacts to the winding of the main relay and adapted to maintain the main contacts closed during the period of closure of the trigger circuit even if the control contact is open, a time relay controlled by the cutting member being interposed in the trigger circuit.

The accompanying drawings show by way of example a device for controlled thinning according to the present invention.

Fig. 3 is a side elevational view, partly in section, of a circuit breaker included in the arrangement of Fig. 1;

Fig. 4 is a plan view, partly in section, of the circuit breaker of Fig. 3;

Fig. 5 is a vertical sectional view, on an enlarged scale, of an electromagnetic valve included in the arrangement of Fig. 1; and Fig. 6 is a perspective view of a feeler electrode included in the arrangement of Fig. 1.

Figure 1:
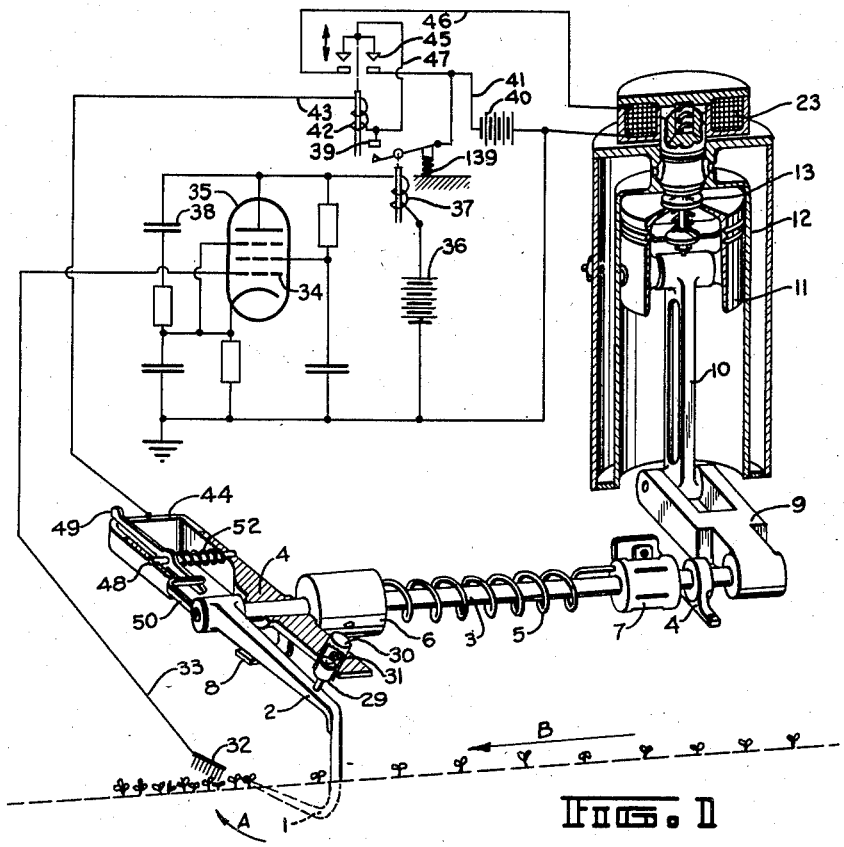
Fig. 1 is a diagrammatic perspective view, partly broken away and in section, and showing the general arrangement of the device.

As shown in Fig. 1, a device embodying this invention includes a thinning member having the shape of a curved blade 1, the lower end of which penetrates beneath the surface of the soil, and its other end being secured to a carrier 2 provided at the end of a deflecting shaft 3 which is parallel with the row of plants to be thinned and mounted in bearings 4 on a suitable transporting carriage (not shown). A spring 5 is arranged on the shaft 3, one end of the spring being fastened in a ring 6 rigidly secured to the shaft 3 and the other end in a collar 7, which is mounted for adjustment so as to allow the tension of the spring 5 to be changed. The spring 5 urges the blade 1 into its operative position in the direction of the arrow A, the rocking movement of the blade in this direction being limited by a stop 8.

The other end of the shaft 3 carries a crank 9 pivotally attached to a connecting rod 10, which is, in turn, pivotally mounted in a piston 11 adapted for reciprocal movement in a cylinder 12 of a pneumatic apparatus.

Mounted in the head of the cylinder 12 is an electromagnetic valve for controlling the entry of compressed air into the cylinder, as will be described hereinafter, and an exhaust valve 13 engageable against its seat 14 from the interior of the cylinder, i. e. the valve 13 opens into the space of the cylinder. The valve 13 is loaded by a spring 15, tending to open the valve. Between the valve 13 and the upper surface of the piston 11 a resilient block 16 is placed, said block being dimensioned so that, when the piston is in its extreme upper position, it acts against the block and thereby presses the valve 13 against its seat 14, so as to close the valve.

The wall of the cylinder 12 is, at a suitable distance from the extreme upper position of the piston, provided with exhaust apertures 17, which are set free by the piston during its downward stroke.

The electromagnetic valve mentioned above is shown on a larger scale in Fig. 5. The valve body consists of a light weight hollow valve cone 18 engageable with a seat 19 in the head of the cylinder 12 for preventing the admission of compressed air into cylinder 12 from a surrounding air chamber 20. The cone 18 has such a shape that neither the pressure in the air chamber 20, nor the pressure in the cylinder hinder its free movement. An armature 21 of an electromagnet is rigidly secured to the cone 18 or is made integral therewith. The body of the electromagnet consists of a ring 22 carrying a winding 23 and is covered on top and at its sides by a pole extension 24, having the shape of a cover protecting the apparatus against the entry of impurities. A spring 25 is inserted between the pole extension 24 and armature 21 to urge the latter downwardly relative to the pole extension into a position, in which the valve cone 18 rests against its seat 19 and thereby prevents the admission of compressed air into the cylinder 12.

An inlay 26 of non-magnetic material e. g. bronze is inserted between the ring 22 of the electromagnet and the pole extension 24 in order to interrupt the flow of magnetic lines of force at this point.

Figure 2:
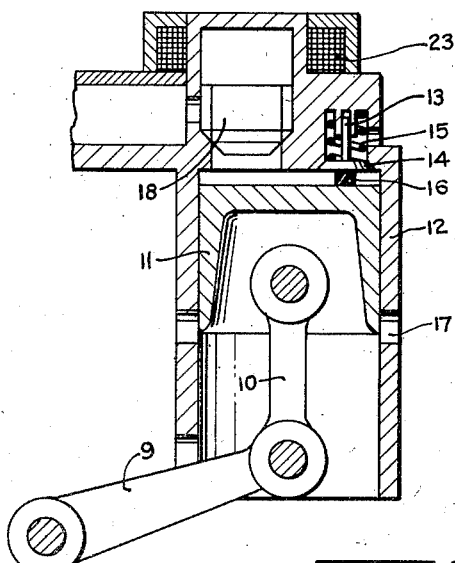
Fig. 2 is a longitudinal sectional view of the cylinder of a pneumatic device and associated parts included in the arrangement of Fig. 1.

The whole electromagnetic valve may be mounted in the air chamber 20 and in this case no seal against the outer atmosphere is necessary. However, if the electromagnet is mounted outside chamber 20, as shown in Figs. 2 and 5, the cone 18 has to be sealed against leakage of compressed air. According to a feature of the invention this is accomplished by inserting a diaphragm 27 between the cone 18 and the armature 21, said diaphragm being clamped at its circumference to the surface of the head of the cylinder by the ring 22. A perfect seal is thus obtained without impairing the movability of the valve cone 18. The diaphragm 27 assists the spring 25 in returning the cone to its closed position (or vice versa if the diaphragm is inserted with a suitable preliminary tension). The cone 18 must of course be rounded or bevelled at its upper surface as shown at 28 in order to allow for its free movement.

The thinning blade 1 may have any suitable shape but, according to the invention, it is preferably shaped in such a way that the projection of its operative portion in a plane perpendicular to the axis of the deflecting shaft 3 is a circular arc, the center of which lies approximately in the axis of the said shaft. A blade of this shape may easily be deflected from the soil. For the same reason the blade 1 has such a length as to extend from the soil at the side of the carrier 2. Its width and thickness has to be as small as possible in order to prevent any unnecessary displacement of soil. Preferably it is shaped as a member of a constant strength i. e. it is tapered parabolically towards its end.

The air chamber 20, which supplies the cylinder 12 with compressed air must have a volume at least 3 times the operative volume of the cylinder 12, in order to secure a uniform supply of air into the pneumatic apparatus and to reduce pressure losses during the period of the admission of air into the cylinder. The operative portion of the valve 18, 19 may therefore be directly inserted into the air chamber 20.

The rocking movement of the blade 1 may be adjusted by means of a buffer 29, mounted for reciprocal movement in a buffer body 30, rigidly secured on a suitable part of the machine, for example, to the adjacent bearing 4. A spring 31 serves to return the buffer 29 to its original position. During rocking movement of the blade 1 the buffer is engaged by the carrier 2 or by any other part, connected with the blade. Apart from limiting the amplitude of the rocking movement the buffer serves to accelerate the return movement of the blade into its operative position after deflection. The buffer may be adjustable and if shifted in the direction towards the carrier 2, it returns the blade 1 into the soil sooner or vice versa.

The means for transmitting electric impulses to the electromagnetic valve and for selecting the plants which have to remain in the row will now be described in detail.

The means for the selection of plants comprises an electrode 32 mounted in front of the blade 1 at a distance from the latter depending on the required lead which is, in turn, dependent on the speed of travel of the machine and on the velocity with which the various mechanisms respond to impulses. The feeler electrode 32 is connected by means of a well insulated cable 33 with a control grid 34 of an electron discharge tube 35, preferably a pentode. The pentode 35 is connected, in a way which is known, in a circuit comprising a source of current 36, a control relay 37, and a condenser 38, interposed between the plate of the tube 35 and the control grid 34 to which the feeler electrode 32 is connected. The electrode 32 and the control grid 34 are therefore on a positive potential so that current flows through the pentode 35. The control relay 37 is therefore normally excited and its contacts 39 are open against the influence of a spring 139 which tends to close the contacts. The contacts 39, which will be called "control contacts," are arranged in a circuit which will be called a "trigger circuit," and extends from one pole of a battery 40 over a conductor 41, control contacts 39, a main relay 42, a conductor 43 to a circuit breaker 44 where the circuit is grounded to the mass of the machine. The other pole of the battery 40 is also grounded.

A further circuit which will be called a "feeding circuit" extends from the source or battery 40 to main contacts 45 which are controlled by the main relay 42, and, by way of a conductor 46, from the contacts 45 to the winding 23 of the electromagnetic valve, shown in Fig. 5 of the pneumatic apparatus described above.

A so called "self-locking circuit" is further provided, said circuit extending from the main contacts 45 over a conductor 47 to the winding of the main relay 42.

The circuit breaker 44 serves on the one hand as a switch and on the other hand as a delay or time relay. A circuit breaker, shown in Figs. 3 and 4 is suitable for the purpose of the invention owing to its simplicity.

On a pin 48 a beam 49 is mounted for rocking movement, the upper arm of the beam serving as a contact of the circuit breaker, said contact being adapted to ground the circuit of the main relay 42 on the mass of the machine. An abutment 50 is adjustably mounted on the shaft 3 of the blade 1, said abutment being adapted to strike against one end of the beam 49, rocking the same out of engagement with the contact plate 51. The beam 49 is returned into engagement with the contact plate 51 by means of a torsion spring 52, the tension of which is adjustable, for example, by means of a rotatably adjustable knob 152 connected to one end of spring 52 and adapted to be fixed in its adjusted position. By changing the tension of the spring 52 and the mass of the beam 49 the period of time needed by the beam to return from its swung-out position, and in this way the period during which the circuit of the main relay 42 is broken, may be exactly adjusted.

The above described apparatus operates as follows:

When the blade 1 is in its operative position in the soil during the travel of the machine in the direction of the arrow B, it destroys all plants in the row. The feeler electrode 32 and therefore the control grid are on a positive potential so that current flows through the discharge tube 35, said current keeping the control relay 37 in energized condition. The relay 37 keeps the control contacts 39 open so that the feeding circuit from the battery 40 is broken, the electromagnetic valve 18 of the pneumatic apparatus is closed and the piston 11 is in its extreme upper position. The circuit breaker 44 is closed, i. e. the beam 49 rests on the contact plate 51.

As soon as the feeler electrode 32 touches the plant, its potential as well as the potential of the control grid 34 sinks to a lower level or to zero. The anode current of the discharge tube 35 drops as well and the control relay 37 becomes deenergized so that the control contacts 39 are closed by the action of the spring 139. The trigger circuit of the main relay 42 is thus closed, said relay closing the main contacts 45, establishing a feeding circuit from the battery 40 to the winding 23 of the electromagnetic valve. At the same time, however, the self-locking circuit 45—47—42 is closed so that the relay 42 remains energized even if the control relay 37 is energized again and disconnects the contacts 39, which takes place immediately after the electrode 32 leaves the plant.

The feeding circuit having been closed, current from the battery 40 causes the electromagnet 22—23 to be energized. The pole extension 24 attracts the armature 21 with the valve cone 18, the latter being lifted from its seat 19. Compressed air from the air chamber 20 flows into the cylinder 12 moving the piston 11 downwardly. The movement of the latter is transmitted by the connecting rod 10 and crank 9 to the deflecting shaft 3 carrying the blade 1, so that the latter is deflected in a direction opposite to the arrow A into an inoperative position where it avoids contact with the selected plant.

During rocking movement of the shaft 3 through a predetermined angle the abutment 50 (Figs. 3 and 4) strikes against the beam 49 rocking the same out of engagement with the contact plate 51. The circuit of the main relay 42 is thus broken and the contacts 45 opened so that the feeding circuit is broken and the electromagnet of the valve 18—23 is de-energized.

The valve cone 18 is returned, by the pressure of the spring 25 (or in addition by the tension of the diaphragm 27), to its seat 19 and the supply of air into the cylinder 12 is interrupted.

As soon as the compressed air is admitted by the electromagnetic valve into the cylinder 12, it moves the piston 11 down, but at the same time it presses the valve 13 on its seat 14 against the influence of the spring 15 so that the valve remains closed. The piston continues its downward movement until its top end wall uncovers the exhaust orifices 17; the compressed air escapes from the cylinder and the pressure in the cylinder falls to zero, whereupon the spring 15 opens the valve 13. At this moment the spring 5 starts to return the shaft 3 with the blade 1 to its original position, which movement is not hindered by the piston 11, because the electromagnetic valve 18—19 is now closed and the exhaust valve 13 open, so that air can freely escape therethrough.

At the end of its upward stroke the piston again closes the exhaust valve 13, as previously mentioned. The pneumatic apparatus is thus ready for the next cycle of operation.

The blade 1 is returned into its normal position in which it destroys the superfluous plants immediately behind the selected plant.

When the spring 5 returns the blade 1 into its original position the abutment 50 releases the beam 49. The latter returns into its initial position on the contact plate 51 but, until it returns to this position, the main relay 42 cannot be energized again or the electromagnetic valve 18—23 opened. This period of time corresponds to the length of the minimum space between consecutive plants left in the row.

Only after the machine has traveled through this minimum space can the engagement of the feeler electrode 32 with the next plant cause a new rocking movement of the blade 1 and a repetition of the described cycle of operations.

In this way a number of small untouched islands is formed in the row, exactly at the required points. The size of the islands depends on the tension of the spring 5, on the position of the exhaust orifices 17, on the length of the blade 1 and on a number of further factors which may be easily controlled, so that the size of the islands may be adjusted as required.

For this purpose the buffer means 29—31 may preferably be used, said buffer accelerating the return of the blade to its original position. If the buffer is near to the carrier 2, the blade 1 returns sooner into the soil, and the undisturbed island is shorter or vice versa.

It is obvious that the circuit breaker may be modified as required but it is essential that it should fulfill the two operative steps mentioned above, i. e. break the circuit and cause a delay before it is closed again. Instead of the circuit breaker shown in Figs. 3 and 4, a time relay may be used, said relay being set in operation by a suitable part provided on the shaft 3, on the transmission mechanism, on the blade 1 or elsewhere.

Particular care has to be given to the design of the electrode 32. It has been found that best results are obtained with an electrode, consisting of wires arranged in the way of a brush, the free ends of the wires engaging the plants.

An example of a suitable design of a feeler electrode is shown in Fig. 6. In a casing 53 a relatively small insulating plate 54 is mounted, said plate 54 being attached to an insulating carrier 55 carrying the wire electrode 56 in the shape of a wire brush. The electrode 56 is connected by a well insulated cable 57 with the control grid 34 of the discharge tube. Since the electrode is subject to humidity, and adverse weather conditions and carries a relatively high potential e. g. up to 500 v., care must be taken to prevent a short circuit of the electrode. This is the purpose of the small insulating plate 54 which contacts the casing 53 only on a relatively narrow, well protected surface.

Care must further be taken to ensure that the wires of the electrode 56 always engage the plants in the correct point i. e. approximately in the center of the plant and, in particular, to prevent premature contact of the electrode with the leaves of the plant. For this purpose a protecting shield 58 is provided in front of the electrode, said shield engaging and bending the leaves which might cause a premature contact and assuring correct engagement at the moment when all the leaves are returned together to their upright position.

The feeler electrode 32 (53—57) with the protecting shield 58 is mounted in front of the blade 1 for adjustment both in longitudinal and in lateral direction on a suitable holder 59 mounted for adjustment and rocking movement so as to enable the electrode to be deflected if it strikes against an obstacle, for example, a stone or the like.

The anode current preferably has a potential of about 150–250 v.; the grid bias (the potential on the feeler electrode) may be lower, but if need be may attain an equal value.

The device according to the invention operates economically and eliminates a substantial amount of the heavy manual labor usually required in thinning plants. The device operates reliably, accurately and with considerable speed. The operation being fully automatic, one vehicle may carry a plurality of thinning units and thin several rows at the same time.

The apparatus may be modified according to local conditions and requirements of operation. For instance instead of one blade a plurality of blades may be used, which are successively brought into engagement with the plants, or the power from the pneumatic apparatus may be transmitted to the blade by a mechanism other than that shown in the drawings. The above, and other modifications of the illustrative embodiment described in detail herein, may be effected without departing from the scope or spirit of the invention, except as defined in the appended claims.

We claim:

1. A device for controlled thinning of plants in a row comprising a thinning blade movable in the soil and adapted to be deflected to circumvent a selected plant, pneumatic deflecting means for deflecting the thinning blade in a predetermined moment, electronic means adapted to actuate said pneumatic deflecting means to deflect the blade, said electronic means comprising a feeding circuit controlling said pneumatic means, a trigger circuit adapted to close the feeding circuit, a self-locking circuit adapted to retain the feeding circuit closed when the trigger circuit is interrupted following closing of the feeding circuit, a feeler electrode mounted in front of the thinning blade for contact with the plants in the row and carrying a positive potential, an electron discharge tube having its grid connected with the feeler electrode, an anode circuit comprising a control relay adapted to retain the trigger circuit broken as long as full anode current flows through the discharge tube but to allow the trigger circuit to be closed upon a drop of the anode current due to a discharge of the positive potential of the feeler electrode when the latter touches a plant, a circuit breaker interposed in the trigger circuit and controlled upon actuation of the thinning blade by said pneumatic deflecting means to then interrupt said trigger circuit, said circuit breaker being adjustable for varying the interval of interruption of the trigger circuit and thereby determining the length of the minimum time between two consecutive deflections of the thinning blade.

2. A device for controlled thinning of plants comprising a thinning blade movable in the soil and adapted to be deflected to circumvent a selected plant, pneumatic deflecting means for actuating the thinning blade in a predetermined moment to circumvent the selected plant, electronic means adapted to actuate the said pneumatic deflecting means to deflect the blade, said electronic means comprising an electron discharge tube having an anode circuit in which there is connected a control relay and control contacts, a feeler electrode connected to the grid of said discharge tube and adapted to be brought into contact with plants in a row, said electrode carrying a positive potential, a trigger circuit comprising a main relay and a circuit breaker operated upon actuation of the thinning blade by said pneumatic means, a feeding circuit for controlling said pneumatic deflecting means, a self-locking circuit, a main relay common to said self-locking circuit and to the trigger circuit, main contacts connected in said feeding circuit and adapted to be closed by said main relay when said control contacts close the trigger circuit under the influence of a drop in the anode current caused by a drop of the positive grid bias upon contact of the electrode with a plant.

3. A device as in claim 1, wherein the circuit breaker comprises a stationary contact plate, a beam mounted for rocking movement, spring means urging said beam against the contact plate, and an abutment movable with said thinning blade and engageable with said beam to rock the latter in the direction effecting disengagement of the beam from said contact plate.

4. A device as in claim 3, wherein the circuit breaker further comprises means for adjusting the tension of the spring means for effecting the variation of the interval of interruption of the trigger circuit.

5. A device as in claim 1, wherein the feeler electrode comprises a casing, an insulating plate in the casing, an insulated carrier secured to the insulating plate, and a brush-like arrangement of feeler wires on said carrier.

6. A device for controlled thinning of plants in a row, comprising a pneumatic cylinder, a piston movable in the cylinder, a spring loaded shaft mounted for oscillatory movement, said shaft being operatively connected with the piston and carrying a thinning blade which is movable in the soil and adapted to be deflected from the row by an oscillation of the shaft, an electromagnetic valve in said cylinder controlling the admission of compressed air into the latter, electric current circuits controlling the operation of the electromagnetic valve, a feeler electrode mounted in front of the thinning blade and carrying an electric potential, an electron discharge tube having its grid connected with the feeler electrode and its plate in a circuit comprising means for controlling the said electric circuits to open the electromagnetic valve upon a drop of the potential of the feeler electrode when touching a plant, and means for rendering said electric current circuits inoperative for a predetermined interval.

7. A device as in claim 6, wherein the pneumatic cylinder is provided with at least one exhaust orifice in its wall, said orifice being uncovered by the piston in a predetermined point on its stroke, and with an exhaust valve opening towards the interior of the cylinder, a spring urging said exhaust valve to an open position, said exhaust valve being closed by movement of said piston to the extreme upper position of the latter.

8. A device as in claim 6, wherein the electromagnetic valve comprises a valve cone, an electromagnet having an armature connected to said valve cone and adapted to be displaced into a position in which the valve cone admits compressed air into the cylinder, a spring being provided for returning the valve cone into its closing position.

9. A device as in claim 8, wherein said electromagnet has a winding and body, in the shape of an annulus surrounding the armature, and a pole extension adapted for co-operation with the armature and having the shape of a cover closing the electromagnet and the armature from outside, an inlay of a nonmagnetic material for interrupting the lines of force being inserted between the pole extension and the body of the electromagnet.

10. A device as in claim 6, wherein the oscillating movement of the shaft, carrying the thinning blade is limited in one direction by a fixed stop and in the other direction by a resilient buffer.

11. A device for effecting the controlled thinning of plants in a row, comprising a thinning blade movable along the row of plants and adapted to be deflected from an operative position in the soil to an inoperative position where it avoids the row of plants; means yieldably urging said blade to the operative position thereof; pressure fluid operated actuating means effective, when pressure fluid is supplied thereto, to cause deflection of the blade to said inoperative position; electro-magnetically operated valve means effective, when energized, to admit pressure fluid to said actuating means; and electronic means for controlling said valve means including a source of electric current, a feeding circuit extending between said source and said electro-magnetically operated valve means for energizing the latter and having normally open main contacts interposed therein, a first solenoid adapted, when energized, to close said main contacts, a trigger circuit for energizing said first solenoid and having control contacts and a circuit breaker interposed in series therewith, a self-locking circuit connecting said main contacts in series with said first solenoid and said circuit breaker to maintain energization of said first solenoid and hold said main contacts closed when said control contacts are opened following closing of said feeding circuit, a feeler electrode positioned in front of said blade for contact with the successive plants in a row and carrying a positive potential which is discharged by contact of said electrode with a plant, an electron discharge tube having its grid connected to said electrode, an anode circuit for said tube having a second solenoid interposed therein to open said control contacts of the trigger circuit as long as full anode current flows through the discharge tube to energize said second solenoid, means urging said control contacts to the closed condition thereof when the anode current drops due to a discharge of the positive potential from said feeler electrode to a plant so that, upon contact of the feeler electrode with a plant, said trigger circuit is closed to effect closing of said feeding circuit and also closing of said self-locking circuit whereby said electro-magnetically operated valve means admits pressure fluid to said actuating means for deflecting said blade to said inoperative position, means opening said circuit breaker in response to deflection of said blade to said operative position, thereby to interrupt said trigger and self-locking circuits and, hence, also said feeding circuit so that the blade is returned to said operative position and remains there until said circuit breaker again closes, and means for closing said circuit breaker determining the minimum length of time that said blade remains in its operative position.

References Cited in the file of this patent

UNITED STATES PATENTS

| | | |
|---|---|---|
| 2,535,720 | Boncompain | Dec. 26, 1950 |
| 2,682,132 | Marihart | June 29, 1954 |